US011370405B2

United States Patent
Rodrigues et al.

(10) Patent No.: US 11,370,405 B2
(45) Date of Patent: Jun. 28, 2022

(54) SYSTEM, CONTROLLER AND METHOD FOR AIR CHARGING

(71) Applicant: Bendix Commercial Vehicle Systems LLC, Elyria, OH (US)

(72) Inventors: Royal Ricky Rodrigues, Avon, OH (US); David J. Pfefferl, Broadview Heights, OH (US); Thomas S. Miller, Jr., Lagrange, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 325 days.

(21) Appl. No.: 16/688,032

(22) Filed: Nov. 19, 2019

(65) Prior Publication Data

US 2021/0146904 A1 May 20, 2021

(51) Int. Cl.
*B60T 17/02* (2006.01)

(52) U.S. Cl.
CPC ......... *B60T 17/02* (2013.01); *B60T 2201/024* (2013.01); *B60T 2270/10* (2013.01); *B60T 2270/30* (2013.01)

(58) Field of Classification Search
CPC .............. B60T 17/02; B60T 2201/024; B60T 2270/30; B60T 2270/10
See application file for complete search history.

(56) References Cited

U.S. PATENT DOCUMENTS

| | | | |
|---|---|---|---|
| 4,201,517 A | 5/1980 | Ferguson | |
| 7,062,366 B2 | 6/2006 | Dussapt | |
| 7,226,273 B2 * | 6/2007 | Doerr | B60T 17/02 417/212 |
| 7,344,201 B1 * | 3/2008 | Bates | B60T 17/02 303/57 |
| 8,260,494 B2 | 9/2012 | Yang | |
| 8,342,150 B2 | 1/2013 | Renner | |
| 8,467,950 B1 | 6/2013 | Pfefferl | |
| 8,718,848 B2 | 5/2014 | Pfefferl | |
| 9,050,957 B2 | 6/2015 | Minato | |
| 9,688,262 B1 | 6/2017 | Pfefferl | |
| 9,926,924 B2 | 3/2018 | Bezze | |
| 10,173,616 B2 | 1/2019 | Adler | |
| 2012/0107138 A1 | 5/2012 | Kreso | |
| 2019/0126712 A1 | 5/2019 | Miller | |

* cited by examiner

*Primary Examiner* — Pamela Rodriguez
(74) *Attorney, Agent, or Firm* — Cheryl Greenly; Brian Kondas; Eugene Clair

(57) ABSTRACT

Various embodiments of a method and apparatus for an air charging system controller for an air braked vehicle are disclosed. The air charging system controller comprises an input for receiving conditions of the vehicle, an output for controlling a compressor in a normal mode and in a high demand mode and control logic. The control logic determines whether the vehicle meets a predetermined condition and controls the compressor in the high demand mode in response to the vehicle meeting the predetermined condition.

12 Claims, 2 Drawing Sheets

SYSTEM, CONTROLLER AND METHOD FOR AIR CHARGING

BACKGROUND

The present invention relates to embodiments of a system, controller and method for air charging in an air brake system. During normal air brake operation, the compressor cycles between a preset cut in pressure and a cut out pressure to provide pressurized air to the air reservoirs for use in braking and other vehicle systems. However, in the case of an antilock braking event or stability control intervention, there can be a steep drop in air pressure available due to the amount of automatic rapid cyclical braking. Conventional air charging systems do not modify their operation to optimize air supply and therefore, the rate of recharging of the air system may not keep up with air demand. There is a need to improve how air is made available when the occurrence of certain high air usage events is projected.

SUMMARY

Various embodiments of an apparatus for an air charging system controller for an air braked vehicle are disclosed. An air charging system controller comprises an input for receiving conditions of the vehicle, an output for controlling a compressor in a normal mode and in a high demand mode and control logic. The control logic determines whether the vehicle meets a predetermined condition and controls the compressor in the high demand mode in response to the vehicle meeting the predetermined condition.

An air braked vehicle system having an air charging system controller is disclosed. The vehicle system includes a compressor and an air charging controller for controlling the compressor. The air charging controller includes control logic for receiving an indication of a vehicle condition; and controlling the compressor in a high demand mode in response to the vehicle condition meeting a predetermined condition.

In accordance with another aspect, various methods of providing air in an air charging system for a vehicle are disclosed. One method comprises controlling a compressor in a normal mode, receiving a vehicle condition and controlling an air compressor in a high demand mode in response to the vehicle condition meeting a predetermined condition.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
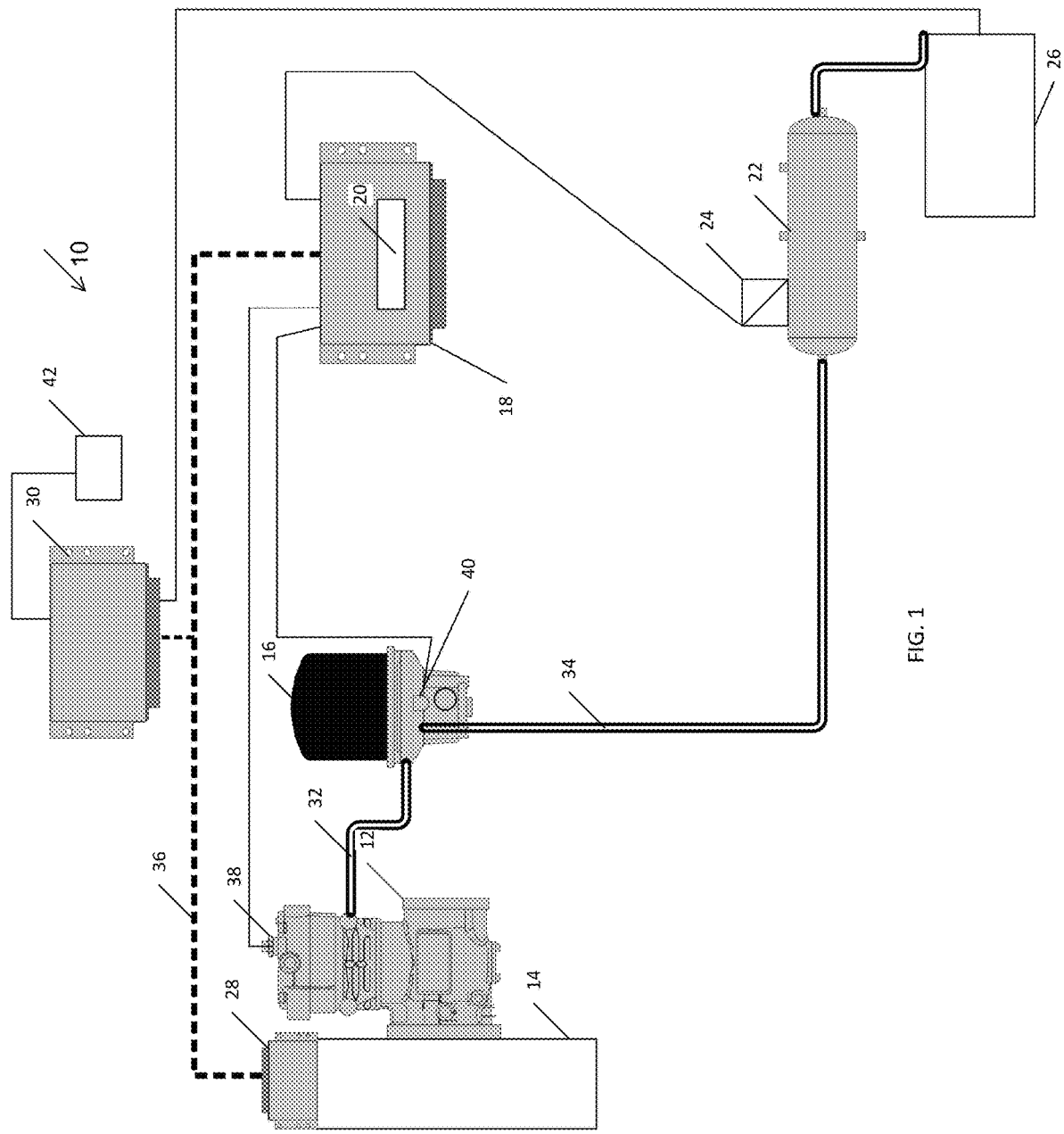
FIG. 1 illustrates a vehicle having an air charging system according to one example of the present invention.

FIG. 1 illustrates a vehicle system 10 for an air braked vehicle. The system 10 includes a compressor 12 for compressing ambient air for usage in the air brake system and other vehicle systems that require air to operate, such as air suspension systems. The compressor 12 is connected to torque source 14. The torque source 14 may be an engine. The compressor 12 may be directly coupled to the torque source 14 or indirectly coupled via a clutching mechanism. The torque source 14 may also be an electric motor if the compressor 12 is remote mounted or used on an electric vehicle. There may be a compressor control device 38 that interfaces with the compressor. The compressor control device 38 may be an electrically controlled unloader valve, a clutch mechanism or another device. The compressor 12 will compress air when acted upon by the torque source 14 unless the compressor control device 38 has put the compressor 12 in an unloaded mode. The unloaded mode is generally set when there the available air pressure has reached a predetermined cut out pressure. The compressor 12 may be cycling but not building air, it may be decoupled from the torque source 14 or it may be deactivated, depending on the application.

The compressed air from compressor 12 passes to an air dryer 16 via air line 32. The air dryer 16 removes a substantial amount of water and oil vapor from the compressed air. The air dryer 16 includes an air dryer control device 40. The air dryer control device 40 may be an electrically controlled purge valve or other device.

The clean compressed air from the air dryer 16 flows via air line 34 to the reservoir system that includes at least one reservoir, as shown by reservoir 22. The reservoir 22 includes a pressure sensor 24 to measure the pressure in the reservoir 22 and transmit the pressure signal. The air stored in the reservoir system is available for use by an air brake system 26 or other air controlled components on the vehicle.

The air charging system of the vehicle comprises the compressor 12, the air dryer 16 and a controller 18. The controller 18 may be mounted on the compressor 12, the air dryer 16 or may be remote remotely mounted. The controller 18 receives pressure signals from the pressure sensor 24. The controller 18 controls the compressor control device 38 to provide different modes of compressor operation. The controller 18 will also control the air dryer control device 40. The controller 18 may include functionality for antilock braking, stability control, electronic parking or other functions related to the air brake system. Alternatively, the controller 18 may only control the air charging system.

The controller 18 includes a processor having control logic 20. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20.

The controller 18 communicates on a vehicle communications bus 36 with other controllers. The communications bus 36 may use a standardized bus format, such as SAE J1939. Other controllers may include, for example, a stand-alone brake controller 30 if the braking functions are not included in controller 18. Other vehicle controllers, such as an engine controller 28 or a transmission controller, may also communicate information on the communications bus 36. The information available on the communications bus 36 may include vehicle operating parameters, such as engine speed. The controller 18 may communicate control messages on the communications bus 36.

The brake controller 30 communicates electrically with the valves that are part of the brake system 26. The brake controller 30 may receive a signal from a stop lamp switch 42. The stop lamp switch 42 is activated each time the driver presses on the brake pedal and provides an indication of brake activity on the vehicle. The brake controller 30 may also include radars and other sensors to implement the functionality of collision warning, collision avoidance and adaptive cruise control. The brake controller 30 uses information regarding the vehicle, such as wheel speed, yaw, acceleration and forward vehicle detection, to determine if a braking intervention is required and the level of braking intervention required.

Certain controllers on the communications bus 36, including the brake controller 30, can transmit an XBR request indicating a service braking request, an AEBS1 message indicating a forward collision emergency braking action or an EBC1 message indicating that antilock braking is active. Controller 18 receives these messages as indicators of current or potential high air usage due to current or impending activation of the air brake system 26.

Therefore, an air charging system controller comprises an input for receiving conditions of the vehicle, an output for controlling a compressor in a normal mode and in a high demand mode and control logic. The control logic determines whether the vehicle meets a predetermined condition and controls the compressor in the high demand mode in response to the vehicle meeting the predetermined condition.

An air braked vehicle system having an air charging system controller is disclosed. The vehicle system includes a compressor and an air charging controller for controlling the compressor. The air charging controller includes control logic for receiving an indication of a vehicle condition; and controlling the compressor in a high demand mode in response to the vehicle condition meeting a predetermined condition.

Figure 2:
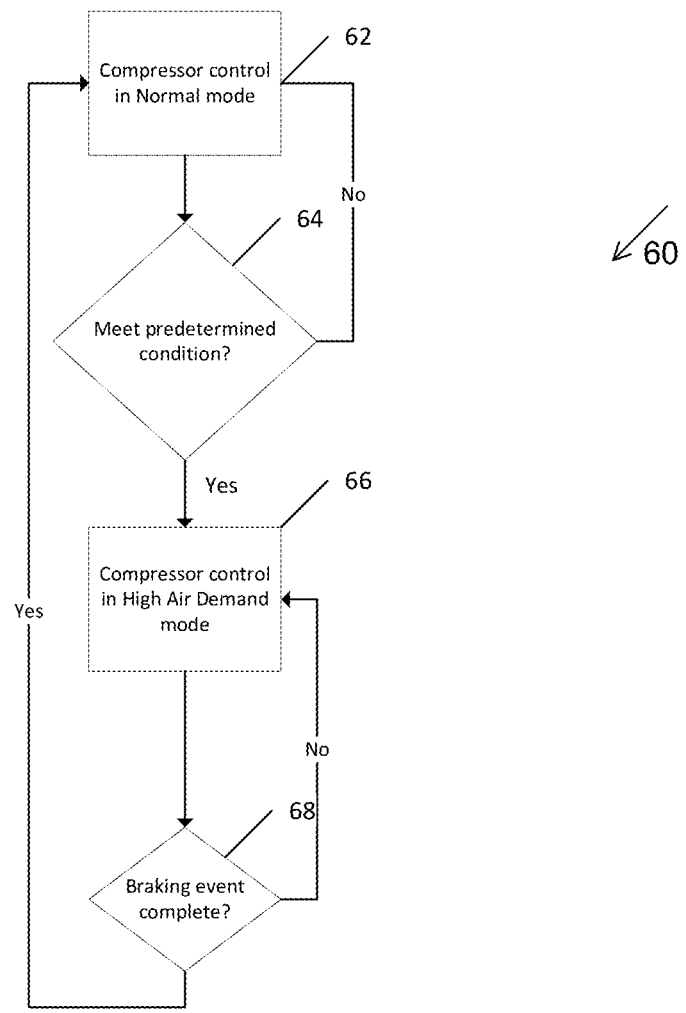
FIG. 2 illustrates a method of controlling the air charging system according to an example of the present invention.

FIG. 2 illustrates a method 60 for controlling the air charging system to ensure there is adequate air for current and future braking events.

Method 60 begins with step 62 when the controller 18 is controlling compressor 12 in a normal mode. A normal mode sets the compressor cut out value, meaning the pressure value at which the controller 18 will stop the compressor 12 from compressing air, at about 130 psi. The pressure is measured from the reservoir 22 by pressure sensor 24, for example. The controller 18 generally stops the compressor 12 from compressing air by setting the compressor control device 38 in the unload mode. Alternatively, the controller 18 can communicate a deactivate message directly to the compressor or transmit a signal to the torque source 14 that is controlling the compressor 12. As air in the reservoir 22 is used by the brake system 26, the pressure in the reservoir 22 will decrease. The compressor cut in value, meaning the pressure value at which the controller 18 will set the compressor control device 38 in a loaded mode so that the compressor 12 can compress air, is set at about 110 psi.

In step 64, the control logic 20 determines if a predetermined condition has been met. The predetermined condition can be an indication of current or projected high air demand. An indication of high air demand may mean an AEBS1 message, XBR request, an EBC1 message, or any combination thereof, has been received by the controller 18 via the communications bus 36. Other indications of high air demand that may be used in the decision making process can include an indication of a low mu surface as received by wheel speed sensors or the vehicle traveling above a predefined speed.

In one example, the control logic 20 can calculate a high brake demand from information received on the communications bus 26 or learned when the controller 18 is also performing braking functions. For example, when the control logic 20 learns a wheel speed at a particular wheel end, the control logic 20 can make a wheel end pressure estimate required to return that wheel end to zero speed. When anti-lock braking is active, as known through the EBC1 message being present, and the peak cycling pressure is low, then the control logic 20 can infer that it will take an extended period of time to stop that wheel end, therefore requiring high brake demand. In another example, during an emergency braking event, defined as an event where the driver applies full braking, it is possible for some wheels on a circuit to be active in anti-lock braking more than other wheels in the circuit. In a vehicle where the loading is not evenly distributed between the rear axles, the lightly loaded axle will tend to have more anti-lock braking activity than the heavily loaded axle. During the emergency braking event it is possible for the wheel(s) which are in anti-lock braking to consume so much air that other wheels with more tractive capability no longer enter anti-lock braking and are therefore not putting peak torque to the road extending the stopping distance.

If the predetermined condition is not met, the method 60 returns to step 62 to continue to control the compressor 12 in the normal mode.

If the control logic 20 determines that the predetermined condition is met, or that high air demand is likely based on the multiple vehicle factors herein disclosed, the control logic 20 changes the control to a high air demand mode in step 66 regardless of any actual usage of air. The control logic 20 will charge the air system above the normal mode cut out pressure to ensure that all wheel ends on the vehicle receive enough air for the entire braking event and are able to provide peak grip to the road.

The high air demand mode includes the following controls. The cut out pressure may be increased to about 140 PSI and the cut in pressure may be lowered to about 105 psi, causing the controller 18 to set the compressor control device 38 in the loaded mode sooner to compressor air. In another example for an engine based compressor, the control logic 20 may send a message to the engine controller 28 and/or transmission controller to disengage the transmission from engine. The engine rotation can be controlled to maintain a speed of the compressor 12 considered ideal for the type of compressor while the compressor 12 continues to compress air. In a motor driven compressor, the controller 18 may send a message to the motor controller to increase speed. In addition, the compressor 12 can be started immediately regardless of the cut in pressure in order to lower the warm up time for a compressor that needs oil warmed prior to running at high speeds. If a high air demand is predicted before the event and the compressor is already running, the motor speed of a motor driven compressor can be varied to slowly reach the cut out pressure to limit the number of stop and start sequences during a high air demand event. This feature will also increase the life of the compressor as they are not frequently being turned off and on. Some types of compressors have a wait time before they are able to be restarted. Entry and exit criteria for determining when to enter the high air demand mode are set to minimize spurious activations and deactivations of the compressor.

In the high air demand mode, the cut out pressure will be increased to about 140 psi to build higher air tank pressure in this case of high air demand. However, the upper limit will be set below any value that would cause over pressurization of the system and subsequent alerts to occur. In one example, the controller 18 can control the air dryer control device 40 to purge the air dryer to relieve pressure once the cut out pressure is reached.

In step 68, the controller 18 determines if the braking event or event requiring high air demand is complete. The braking event being complete means that there are no longer messages regarding the braking events being communicated on the communications bus 36. In the instance where the braking functions are located inside the controller 18, then controller 18 is no longer controlling the braking system 26 in response to wheel speed, yaw, forward vehicle detection etc.

If the braking event is not complete, the method 60 returns to step 66 to continue to control the compressor 12 in the high air demand mode. For example, antilock braking may continue for some time after the initial message is communicated.

If the braking event is complete and the indication of high air demand is no longer present, the method 60 returns to step 62. The controller will then control the compressor in the normal mode with the normal mode cut in and cut out pressure thresholds. In another example, the control logic 20 will determine if the pressure at the reservoir 22 is greater than the cut out pressure established in the high air demand mode. The control logic 20 may continue to build the pressure to the cut out limit set in the high air demand mode. After that cut out pressure is reached, the cut in and cut out pressure for the normal mode will be returned.

In this manner, the air charging system is pre-emptively readied so that the compressor can be in peak operation before the event and will be kept at that operating state until the high braking demand event is completed. Automated braking events can now be tuned for more precise and predictable operation assuming that a specific air pressure range will consistently be available for use by the braking system 26 throughout the braking event. This method will ensure that there is no steep drop in available air pressure. With this high air demand mode, the vehicle will have plenty of air to safely brake the vehicle when required and the air will keep replenishing to ensure that the braking event can effectively continue.

Therefore, a method of providing air in an air charging system for a vehicle comprise controlling a compressor in a normal mode, receiving a brake demand and controlling an air compressor in a high demand mode in response to the brake demand.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An air charging system controller for an air braked vehicle comprising:
   an input for receiving conditions of the vehicle;
   an output for controlling a compressor in a normal mode and in a high demand mode; and
   control logic for
      determining whether the vehicle meets a predetermined condition; and
      controlling the compressor in the high demand mode in response to the vehicle meeting the predetermined condition regardless of any actual usage of air;
      wherein the predetermined condition is the vehicle is preparing to perform at least one of an anti-lock braking event, a stability control braking event and a collision mitigation braking event.

2. The air charging system controller as in claim 1, wherein the high demand mode comprises: increasing the cut out and cut in pressure of the compressor from the normal mode.

3. The air charging system controller as in claim 1, further comprising controlling the compressor in the normal mode in response to the absence of the predetermined condition.

4. The air charging system controller as in claim 1, wherein the predetermined condition is determined internal to the air charging system controller.

5. A vehicle system comprising:
   a compressor;
   an air charging controller for controlling the compressor;
      wherein the air charging controller comprises control logic for:
   receiving an indication of a vehicle condition; and
   controlling the compressor in a high demand mode in response to the vehicle condition meeting a predetermined condition regardless of any actual usage of air;
      wherein the predetermined condition is the vehicle is preparing to perform at least one of an anti-lock braking event, a stability control braking event and a collision mitigation braking event.

6. The vehicle system as in claim 5, wherein the high demand mode comprises increasing the cut out pressure of the compressor.

7. The vehicle system as in claim 5 further comprising:
   a braking controller for controlling the brakes; and
   a communication bus for facilitating communication between the air charging controller and the braking controller, wherein the braking controller transmits an indication of at least one of the anti-lock braking event, the stability control braking event and the collision mitigation braking event on the communication bus.

8. The vehicle system as in claim 5 further comprising a motor for driving the compressor, wherein the high demand mode comprises controlling the motor driving the compressor at a speed higher than in a normal mode.

9. A method of providing air in an air charging system for a vehicle comprising:
   controlling a compressor in a normal mode;
   receiving a vehicle condition; and
   controlling the compressor in a high demand mode in response to the vehicle condition meeting a predetermined condition regardless of any actual usage of air;
      wherein the predetermined condition is the vehicle is preparing to perform at least one of an anti-lock braking event, a stability control braking event and a collision mitigation braking event.

10. The method as in claim 9, further comprising controlling the compressor in a high demand mode by increasing the cut out and cut in pressure of the compressor from the normal mode.

11. The method as in claim 9, further comprising controlling the compressor in the normal mode in response to the absence of the vehicle condition meeting the predetermined condition.

12. The method as in claim 9, further comprising controlling the compressor to provide air within the high demand mode cut in and cut out pressure so that at least one of the anti-lock braking event, stability control braking event and collision mitigation braking event can be tuned to the cut in and cut out pressure range.

* * * * *